United States Patent
Stoehr et al.

(10) Patent No.: US 9,783,630 B2
(45) Date of Patent: Oct. 10, 2017

(54) USE OF COMB POLYMERS FOR REDUCING FUEL CONSUMPTION

(75) Inventors: Torsten Stoehr, Frankfurt (DE); Dieter Janssen, Gross-Umstadt (DE); Juergen Schnabel, Muehltal (DE); Boris Eisenberg, Heppenheim (DE); Hans Goerlitzer, Dreieich (DE); Michael Mueller, Bensheim (DE)

(73) Assignee: Evonik Oil Additives GmbH, Darmstadt (DE)

( * ) Notice: Subject to any disclaimer, the term of this patent is extended or adjusted under 35 U.S.C. 154(b) by 0 days.

(21) Appl. No.: 12/668,209

(22) PCT Filed: Apr. 10, 2008

(86) PCT No.: PCT/EP2008/054355
§ 371 (c)(1),
(2), (4) Date: Jan. 8, 2010

(87) PCT Pub. No.: WO2009/007147
PCT Pub. Date: Jan. 15, 2009

(65) Prior Publication Data
US 2010/0190671 A1    Jul. 29, 2010

(30) Foreign Application Priority Data

Jul. 9, 2007 (DE) .......... 10 2007 032 120
Sep. 26, 2007 (DE) .......... 10 2007 046 223

(51) Int. Cl.
| | | |
|---|---|---|
| *C10M 145/14* | (2006.01) | |
| *C08F 290/04* | (2006.01) | |
| *C10M 143/12* | (2006.01) | |
| *C10M 143/00* | (2006.01) | |
| *C10M 143/10* | (2006.01) | |

(52) U.S. Cl.
CPC ......... *C08F 290/04* (2013.01); *C10M 143/00* (2013.01); *C10M 143/10* (2013.01); *C10M 143/12* (2013.01); *C10M 145/14* (2013.01); *C10M 2205/00* (2013.01); *C10M 2205/04* (2013.01); *C10M 2205/06* (2013.01); *C10M 2209/00* (2013.01); *C10M 2209/08* (2013.01); *C10N 2220/022* (2013.01); *C10N 2230/02* (2013.01); *C10N 2230/54* (2013.01)

(58) Field of Classification Search
CPC .. C08F 290/04; C10M 143/00; C10M 143/10; C10M 143/12; C10M 145/00; C10M 145/14; C10M 2205/00; C10M 2205/06; C10M 2209/00; C10M 2209/08; C10M 2209/084; C10N 2220/022; C10N 2230/02; C10N 2230/54
USPC .................................. 508/469, 591
See application file for complete search history.

(56) References Cited

U.S. PATENT DOCUMENTS

| | | | | |
|---|---|---|---|---|
| 5,565,130 A | * | 10/1996 | Omeis .................. | C08F 290/04 508/262 |
| 5,597,871 A | * | 1/1997 | Auschra et al. ............ | 525/309 |
| 6,127,481 A | * | 10/2000 | Janssen et al. ............ | 525/106 |
| 2005/0148749 A1 | | 7/2005 | Scherer et al. | |
| 2006/0189490 A1 | | 8/2006 | Dardin et al. | |
| 2007/0191238 A1 | | 8/2007 | Fischer et al. | |
| 2007/0197409 A1 | | 8/2007 | Scherer et al. | |
| 2007/0213237 A1 | | 9/2007 | Scherer et al. | |
| 2007/0219101 A1 | | 9/2007 | Scherer et al. | |

(Continued)

FOREIGN PATENT DOCUMENTS

| | | |
|---|---|---|
| DE | 44 09 259 | 9/1995 |
| DE | 10 2005 031 244 | 2/2007 |

(Continued)

OTHER PUBLICATIONS

U.S. Appl. No. 61/186,744, filed Jun. 12, 2009, Radano, et al.

(Continued)

*Primary Examiner* — Taiwo Oladapo
(74) *Attorney, Agent, or Firm* — Oblon, McClelland, Maier & Neustadt, L.L.P.

(57) ABSTRACT

The present invention relates to the use of comb polymers comprising, in the main chain, repeat units which are derived from polyolefin-based macromonomers, and repeat units which are derived from low molecular weight monomers selected from the group consisting of styrene monomers having 8 to 17 carbon atoms, alkyl (meth)acrylates having 1 to 10 carbon atoms in the alcohol group, vinyl esters having 1 to 11 carbon atoms in the acyl group, vinyl ethers having 1 to 10 carbon atoms in the alcohol group, (di)alkyl fumarates having 1 to 10 carbon atoms in the alcohol group, (di)alkyl maleates having 1 to 10 carbon atoms in the alcohol group and mixtures of these monomers, where the molar degree of branching is in the range of 0.1 to 10 mol % and the comb polymer comprises a total of at least 80% by weight, based on the weight of the repeat units, of repeat units which are derived from polyolefin-based macromonomers and repeat units which are derived from low molecular weight monomers selected from the group consisting of styrene monomers having 8 to 17 carbon atoms, alkyl (meth)acrylates having 1 to 10 carbon atoms in the alcohol group, vinyl esters having 1 to 11 carbon atoms in the acyl group, vinyl ethers having 1 to 10 carbon atoms in the alcohol group, (di)alkyl fumarates having 1 to 10 carbon atoms in the alcohol group, (di)alkyl maleates having 1 to 10 carbon atoms in the alcohol group and mixtures of these monomers, for reducing the fuel consumption of vehicles.

13 Claims, No Drawings

(56) References Cited

U.S. PATENT DOCUMENTS

| | | |
|---|---|---|
| 2008/0146475 A1 | 6/2008 | Mueller et al. |
| 2008/0194443 A1 | 8/2008 | Stohr et al. |
| 2009/0048406 A1 | 2/2009 | Iroff et al. |
| 2009/0064568 A1 | 3/2009 | Stohr et al. |
| 2009/0182145 A1 | 7/2009 | Bohmke et al. |

FOREIGN PATENT DOCUMENTS

| | | |
|---|---|---|
| EP | 0 621 293 A1 | 10/1994 |
| EP | 0 699 694 | 3/1996 |
| JP | 6-306130 | 11/1994 |
| JP | 8-169922 | 7/1996 |
| JP | 2006-8842 A | 1/2006 |
| WO | WO 2007003238 A1 * | 1/2007 |

OTHER PUBLICATIONS

U.S. Appl. No. 12/672,231, filed Feb. 4, 2010, Stoehr, et al.
U.S. Appl. No. 13/202,744, filed Aug. 22, 2011, Eisenberg, et al.
U.S. Appl. No. 13/255,218, filed Sep. 7, 2011, Eisenberg, et al.
U.S. Appl. No. 61/421,867, filed Dec. 10, 2010, Radano, et al.
U.S. Appl. No. 61/408,274, filed Oct. 29, 2010, Neveu, et al.
U.S. Appl. No. 61/421,870, filed Dec. 10, 2010, Radano.
U.S. Appl. No. 13/213,547, filed Aug. 19, 2011, Mueller, et al.
U.S. Appl. No. 13/318,492, filed Nov. 2, 2011, Radano, et al.
U.S. Appl. No. 61/393,076, filed Oct. 14, 2010, Langston, et al.
U.S. Appl. No. 61/527,800, filed Aug. 26, 2011, McElwain, et al.
U.S. Appl. No. 61/421,876, filed Dec. 10, 2010, Radano.
U.S. Appl. No. 11/995,945, filed Jan. 17, 2008, Stoehr, et al.
Office Action issued Mar. 19, 2013 in Japanese Patent Application No. 2010-515431 (German translation only).

\* cited by examiner

USE OF COMB POLYMERS FOR REDUCING FUEL CONSUMPTION

RELATED APPLICATION

This application is a national stage entry of PCT/EP08/54355, filed Apr. 10, 2008 which claims priority from German Patent Application DE 10 2007 046 223, filed Sep. 26, 2007, and from German Patent Application DE 2007 032 120, filed Jul. 9, 2007, which are incorporated by reference in their entirety.

The present invention relates to the use of comb polymers for reducing fuel consumption. The present invention further describes comb polymers with improved properties and processes for their preparation and use.

Reducing the fuel consumption of vehicles is becoming ever more important for a variety of reasons. In addition to many construction improvements in the vehicles themselves, efforts are also being undertaken to minimize the churning loss caused by the lubricants, for example the engine oils and transmission oils.

It is known that fuel-saving motor oil formulations feature good VI properties. Accordingly, on the one hand, sufficiently high viscosities should be generated at high temperatures to obtain non-breaking thick lubricant films which lead to a minimization of wear. On the other hand, very low viscosities at low temperatures are desirable, in order to reduce fuel consumption by minimizing internal friction in the motor oil. Motor oils which have a relatively low viscosity at low temperatures but can be used at high temperatures are in many cases referred to as fuel-economy oils.

As is well known, the formulation of motor oils is defined by the SAE J300 standard (SAE=Society of Automotive Engineers). This standard classifies motor oils into the SAE viscosity grades xW-y where x=0, 5, 10, 15, 20, 35 and y=20, 30, 40, 50, 60. This is done via the CCS viscosity (cold cranking simulator, ASTM D5292), the dynamic viscosity DV and the yield stress YS in a mini-rotary viscometer with temperature program 1 (MRV-TP1, ASTM D4684), the kinematic viscosity KV (ASTM D445) and the high-temperature high-shear viscosity HTHS (ASTM D4683, D4741 and D5471).

While a more recent formulation strategy for fuel-saving motor oils has concentrated on a low kinematic $KV_{40}$, i.e. high kinematic VI (cf. K. Hedrich, M. A. Mueller, M. Fischer: "Evaluation of Ashless, Phosphorus Free and Low Sulfur Polymeric Additives that Improve the Performance of Fuel Efficient Engine Oils" in Conference Proceedings of the International Tribology Conference (ITC 2005) at Kobe/Japan), the established formulation strategy is aimed at low high-temperature high-shear viscosity $HTHS_∂$ where $∂=70$, 80, 90 or 100° C., i.e. the $HTHS_∂$ should be as little as possible higher than the $HTHS_{150}$ (key parameter in the formulation of the SAE J300) (cf. Toshio Sakurai (ed.): "Additives for Petroleum-derived Products", Saiwai Shobou Press, 1986; A. K. Gangopadhyay, J. Sorab, P. A. Willermet, K. Schriewer, K. Fyfe, P. K. S Lai: "Prediction of ASTM Sequence VI and VIA Fuel Economy Based on Laboratory Bench Tests", SAE Technical Paper Series 961140; N. Nakamura: Idemitsu Technical Review (2000), 24; and T. Mang, W. Dresel (eds.): "Lubricants and Lubrication", Wiley-VCH, Weinheim 2001). The more recent and established formulation strategies for fuel saving are—as detailed above—not congruent and their validity is not undisputed.

At the same time, motor oils are defined by their post-shear viscosity $KV_{100}$. Here, it is entirely desirable for many users, after shearing, for example, by 30 cycles of a Bosch pump (DIN 51382), still to be within the KV100 window of the SAE J300.

A widespread class of commercial VI improvers is that of hydrogenated styrene-diene copolymers (HSDs). These HSDs may be present both in the form of $(-B-A)_n$ stars (U.S. Pat. No. 4,116,917 to Shell Oil Company) and in the form of A-B diblock and A-B-A triblock copolymers (U.S. Pat. No. 3,772,196 and U.S. Pat. No. 4,788,316 to Shell Oil Company). In these formulae, A is a block of hydrogenated polyisoprene and B is a divinylbenzene-crosslinked polystyrene ring or a block of polystyrene. The Infineum SV series from Infineum International Ltd., Abingdon, UK includes products of this type. Typical star polymers are Infineum SV 200, 250 and 260. Infineum SV 150 is a diblock polymer. The products mentioned are free of carrier oils or solvents. Especially the star polymers such as Infineum SV 200 are extremely advantageous with regard to thickening action, viscosity index and shear stability.

In addition, polyalkyl (meth)acrylates (PAMAs) can also be used to improve the viscosity index (VI). For instance, EP 0 621 293 and EP 0 699 694 to Röhm GmbH describe advantageous comb polymers. A further improvement in the VI can be achieved according to the teaching of WO 2007/025837 to RohMax Additives by complying with specific parameters. An improvement in the fuel consumption is not detailed in these publications.

Advantageous properties with regard to soot dispersion (piston cleanliness), wear protection and friction modification in motor oils can be established in conventional PAMA chemistry by grafting N-vinyl compounds (usually N-vinylpyrrolidone) onto PAMA base polymers (DE 1 520 696 to Röhm and Haas and WO 2006/007934 to RohMax Additives). Viscoplex® 6-950 is such a PAMA, which is obtainable commercially from RohMax Additives, Darmstadt, Germany.

The approaches detailed above do lead to a reduction in the fuel consumption. However, there is still the permanent desire to further improve fuel consumption.

In view of the prior art, it was thus an object of the present invention to provide an additive which leads to a reduction in the fuel consumption. This reduction in the fuel consumption should be achieved in various test methods which generally take account of different driving behaviour. Accordingly, the additive should lead to fuel oils with a very low kinematic $KV_{40}$ and also a low high-temperature high-shear viscosity $HTHS_∂$ where $∂=70$, 80, 90 or 100° C., i.e. the $HTHS_∂$ should be as little as possible higher than the $HTHS_{150}$.

It was a further object of the invention to provide additives which can be prepared in a simple and inexpensive manner, while commercially available components in particular should be used. At the same time, they should be producible on the industrial scale without novel plants or plants of complicated construction being required for this purpose.

These objects and further objects which are not stated explicitly but are immediately derivable or discernible from the connections discussed by way of introduction herein are achieved by the use of comb polymers as described in the embodiments of the present invention.

The present invention accordingly provides for the use of comb polymers comprising, in the main chain, repeat units which are derived from polyolefin-based macromonomers, and repeat units which are derived from low molecular weight monomers selected from the group consisting of styrene monomers having 8 to 17 carbon atoms, alkyl (meth)acrylates having 1 to 10 carbon atoms in the alcohol group, vinyl esters having 1 to 11 carbon atoms in the acyl group, vinyl ethers having 1 to 10 carbon atoms in the alcohol group, (di)alkyl fumarates having 1 to 10 carbon atoms in the alcohol group, (di)alkyl maleates having 1 to 10 carbon atoms in the alcohol group and mixtures of these monomers, where the molar degree of branching is in the range of 0.1 to 10 mol % and the comb polymer comprises a total of at least 80% by weight, based on the weight of the repeat units, of repeat units which are derived from polyolefin-based macromonomers and repeat units which are derived from low molecular weight monomers selected from the group consisting of styrene monomers having 8 to 17 carbon atoms, alkyl (meth)acrylates having 1 to 10 carbon atoms in the alcohol group, vinyl esters having 1 to 11 carbon atoms in the acyl group, vinyl ethers having 1 to 10 carbon atoms in the alcohol group, (di)alkyl fumarates having 1 to 10 carbon atoms in the alcohol group, (di)alkyl maleates having 1 to 10 carbon atoms in the alcohol group and mixtures of these monomers, for reducing the fuel consumption of vehicles.

Particular advantages can surprisingly be achieved by particular comb polymers which are provided by the present invention. The present invention accordingly further provides comb polymers comprising, in the main chain, repeat units which are derived from polyolefin-based macromonomers, and repeat units which are derived from low molecular weight monomers selected from the group consisting of styrene monomers having 8 to 17 carbon atoms, alkyl (meth)acrylates having 1 to 10 carbon atoms in the alcohol group, vinyl esters having 1 to 11 carbon atoms in the acyl group, vinyl ethers having 1 to 10 carbon atoms in the alcohol group, (di)alkyl fumarates having 1 to 10 carbon atoms in the alcohol group, (di)alkyl maleates having 1 to 10 carbon atoms in the alcohol group and mixtures of these monomers, where the comb polymer comprises a total of at least 80% by weight, based on the weight of the repeat units, of repeat units which are derived from polyolefin-based macromonomers and repeat units which are derived from low molecular weight monomers selected from the group consisting of styrene monomers having 8 to 17 carbon atoms, alkyl (meth)acrylates having 1 to 10 carbon atoms in the alcohol group, vinyl esters having 1 to 11 carbon atoms in the acyl group, vinyl ethers having 1 to 10 carbon atoms in the alcohol group, (di)alkyl fumarates having 1 to 10 carbon atoms in the alcohol group, (di)alkyl maleates having 1 to 10 carbon atoms in the alcohol group and mixtures of these monomers, which are characterized in that the comb polymer has 8 to 30% by weight of repeat units which are derived from polyolefin-based macromonomers, and the molar degree of branching of the comb polymer is in the range of 0.3% to 1.1%.

As a result, it is possible in an unforeseeable manner to provide additives for lubricant oils which lead to a reduction in the fuel consumption of motor vehicles. This reduction of the fuel consumption can be achieved in the case of different driving modes, i.e. in the case of a wide variety of different requirements. Accordingly, the additive in lubricant oils leads to a low kinematic $KV_{40}$ and to a low high-temperature high-shear viscosity $HTHS_{\partial}$ where a $\partial=70, 80, 90$ or $100°$ C., i.e. the $HTHS_{\partial}$ is only slightly higher than the $HTHS_{150}$.

Moreover, the inventive comb polymers exhibit a particularly favourable property profile. For instance, the comb polymers are surprisingly shear-stable, such that the lubricants have a very long lifetime. Furthermore, the present comb polymers are compatible with many additives. As a result, the lubricants can be adjusted to a wide variety of different requirements. For example, it is possible to prepare lubricants with excellent low-temperature properties, which comprise the present comb polymers.

Furthermore, the inventive comb polymers can be prepared in a simple and inexpensive manner, and commercially available components in particular can be used. Moreover, the comb polymers of the present invention can be prepared on the industrial scale without new plants or plants of complicated construction being required.

The term "comb polymer" used herein is known per se, meaning that relatively long side chains are bonded to a polymeric main chain, frequently also known as the backbone. In the present case, the inventive polymers have at least one repeat unit which is derived from polyolefin-based macromonomers. The exact proportion is evident via the molar degree of branching. The term "main chain" does not necessarily mean that the chain length of the main chain is greater than that of the side chains. Instead, this term relates to the composition of this chain. While the side chain has very high proportions of olefinic repeat units, especially units which are derived from alkenes or alkadienes, for example ethylene, propylene, n-butene, isobutene, butadiene, isoprene, the main chain comprises relatively large proportions of polar unsaturated monomers which have been detailed above.

The term "repeat unit" is widely known in the technical field. The present comb polymers can preferably be obtained by means of free-radical polymerization of macromonomers and low molecular weight monomers. In this reaction, double bonds are opened up to form covalent bonds. Accordingly, the repeat unit arises from the monomers used. However, the present comb polymers can also be obtained by polymer-analogous reactions and/or graft copolymerization. In this case, the converted repeat unit of the main chain is counted as a repeat unit which is derived from a polyolefin-based macromonomer. The same applies in the case of preparation of the inventive comb polymers by graft copolymerization.

The present invention describes comb polymers which preferably have a high oil solubility. The term "oil-soluble" means that a mixture of a base oil and an inventive comb polymer which has at least 0.1% by weight, preferably at least 0.5% by weight of the inventive comb polymers is preparable without macroscopic phase formation. The comb polymer can be present in dispersed and/or dissolved form in this mixture. The oil solubility depends in particular on the proportion of lipophilic side chains and on the base oil. This property is known to those skilled in the art and can be adjusted for the particular base oil easily via a proportion of lipophilic monomers.

The inventive comb polymers comprise repeat units which are derived from polyolefin-based macromonomers. Polyolefin-based macromonomers are known in the technical field. These repeat units comprise at least one group which is derived from polyolefins. Polyolefins are known in the technical field, and can be obtained by polymerizing alkenes and/or alkadienes which consist of the elements carbon and hydrogen, for example C2-C10-alkenes such as ethylene, propylene, n-butene, isobutene, norbornene, and/or C4-C10-alkadienes such as butadiene, isoprene, norbornadiene. The repeat units derived from polyolefin-based macromonomers comprise preferably at least 70% by weight and more preferably at least 80% by weight and most preferably at least 90% by weight of groups which are derived from alkenes and/or alkadienes, based on the weight of the repeat units derived from polyolefin-based macromonomers. The polyolefinic groups may in particular also be present in hydrogenated form. In addition to the groups which are derived from alkenes and/or alkadienes, the repeat units derived from polyolefin-based macromonomers may comprise further groups. These include small proportions of copolymerizable monomers. These monomers are known per se and include, among other monomers, alkyl (meth) acrylates, styrene monomers, fumarates, maleates, vinyl esters and/or vinyl ethers. The proportion of these groups based on copolymerizable monomers is preferably at most 30% by weight, more preferably at most 15% by weight, based on the weight of the repeat units derived from polyolefin-based macromonomers. In addition, the repeat units derived from polyolefin-based macromonomers may comprise start groups and/or end groups which serve for functionalization or are caused by the preparation of the repeat units derived from polyolefin-based macromonomers. The proportion of these start groups and/or end groups is preferably at most 30% by weight, more preferably at most 15% by weight, based on the weight of the repeat units derived from polyolefin-based macromonomers.

The number-average molecular weight of the repeat units which are derived from polyolefin-based macromonomers is preferably in the range from 500 to 50 000 g/mol, more preferably from 700 to 10 000 g/mol, in particular from 1500 to 4900 g/mol and most preferably from 2000 to 3000 g/mol.

In the case of preparation of the comb polymers via the copolymerization of low molecular weight and macromolecular monomers, these values arise through the properties of the macromolecular monomers. In the case of polymer-analogous reactions, this property arises, for example, from the macroalcohols and/or macroamines used taking account of the converted repeat units of the main chain. In the case of graft copolymerizations, the proportion of polyolefins formed which have not been incorporated into the main chain can be used to conclude the molecular weight distribution of the polyolefin.

The repeat units which are derived from polyolefin-based macromonomers preferably have a low melting point, which is measured by means of DSC. The melting point of the repeat units derived from the polyolefin-based macromonomers is preferably less than or equal to −10° C., especially preferably less than or equal to −20° C., more preferably less than or equal to −40° C. Most preferably, no DSC melting point can be measured for the repeat units which are derived from the polyolefin-based macromonomers.

In addition to the repeat units which are derived from the polyolefin-based macromonomers, the inventive comb polymers comprise repeat units which are derived from low molecular weight monomers selected from the group consisting of styrene monomers having 8 to 17 carbon atoms, alkyl (meth)acrylates having 1 to 10 carbon atoms in the alcohol group, vinyl esters having 1 to 11 carbon atoms in the acyl group, vinyl ethers having 1 to 10 carbon atoms in the alcohol group, (di)alkyl fumarates having 1 to 10 carbon atoms in the alcohol group, (di)alkyl maleates having 1 to 10 carbon atoms in the alcohol group, and mixtures of these monomers. These monomers are widely known in the technical field.

The expression "low molecular weight" makes it clear that some of the repeat units of the backbone of the comb polymer have a low molecular weight. Depending on the preparation, this molecular weight may result from the molecular weight of the monomers used to prepare the polymers. The molecular weight of the low molecular weight repeat units or of the low molecular weight monomers is preferably at most 400 g/mol, more preferably at most 200 g/mol and most preferably at most 150 g/mol.

Examples of styrene monomers having 8 to 17 carbon atoms are styrene, substituted styrenes having an alkyl substituent in the side chain, for example α-methylstyrene and α-ethylstyrene, substituted styrenes having an alkyl substituent on the ring, such as vinyltoluene p-methylstyrene, halogenated styrenes, for example monochlorostyrenes, dichlorostyrenes, tribromostyrenes and tetrabromostyrenes.

The expression "(meth)acrylates" encompasses acrylates and methacrylates, and also mixtures of acrylates and methacrylates. The alkyl (meth)acrylates having 1 to 10 carbon atoms in the alcohol group include especially (meth)acrylates which derive from saturated alcohols, such as methyl (meth)acrylate, ethyl (meth)acrylate, n-propyl (meth)acrylate, isopropyl (meth)acrylate, n-butyl (meth)acrylate, tert-butyl (meth)acrylate, pentyl (meth)acrylate, hexyl (meth)acrylate, 2-ethyl-hexyl (meth)acrylate, heptyl (meth)acrylate, 2-tert-butylheptyl (meth)acrylate, octyl (meth)acrylate, 3-isopropylheptyl (meth)acrylate, nonyl (meth)acrylate, decyl (meth)acrylate; (meth)acrylates which derive from unsaturated alcohols, for example 2-propynyl (meth)acrylate, allyl (meth)acrylate, vinyl (meth)acrylate, oleyl (meth)acrylate; cycloalkyl (meth)acrylates such as cyclopentyl (meth)acrylate, 3-vinylcyclohexyl (meth)acrylate.

Preferred alkyl (meth)acrylates include 1 to 8, more preferably 1 to 4 carbon atoms in the alcohol group. The alcohol group here may be linear or branched.

Examples of vinyl esters having 1 to 11 carbon atoms in acyl group include vinyl formate, vinyl acetate, vinyl propionate, vinyl butyrate. Preferred vinyl esters include 2 to 9, more preferably 2 to 5 carbon atoms in the acyl group. The acyl group here may be linear or branched.

Examples of vinyl ethers having 1 to 10 carbon atoms in the alcohol group include vinyl methyl ether, vinyl ethyl ether, vinyl propyl ether, vinyl butyl ether. Preferred vinyl ethers include 1 to 8, more preferably 1 to 4 carbon atoms in the alcohol group. The alcohol group here may be linear or branched.

The notation "(di)ester" means that monoesters, diesters and mixtures of esters, especially of fumaric acid and/or of maleic acid, may be used. The (di)alkyl fumarates having 1 to 10 carbon atoms in the alcohol group include monomethyl fumarate, dimethyl fumarate, monoethyl fumarate, diethyl fumarate, methyl ethyl fumarate, monobutyl fumarate, dibutyl fumarate, dipentyl fumarate and dihexyl fumarate. Preferred (di)alkyl fumarates comprise 1 to 8, more preferably 1 to 4 carbon atoms in the alcohol group. The alcohol group here may be linear or branched.

The (di)alkyl maleates having 1 to 10 carbon atoms in the alcohol group include monomethyl maleate, dimethyl maleate, monoethyl maleate, diethyl maleate, methyl ethyl maleate, monobutyl maleate, dibutyl maleate. Preferred (di) alkyl maleates comprise 1 to 8, more preferably 1 to 4 carbon atoms in the alcohol group. The alcohol group here may be linear or branched.

In addition to the repeat units detailed above, the inventive comb polymers may comprise further repeat units which are derived from further comonomers, their proportion being at most 20% by weight, preferably at most 10% by weight and more preferably at most 5% by weight, based on the weight of the repeat units.

These also include repeat units which are derived from alkyl (meth-) acrylates having 11 to 30 carbon atoms in the alcohol group, especially undecyl (meth)acrylate, 5-methylundecyl (meth)acrylate, dodecyl (meth)acrylate, 2-methyldodecyl (meth)acrylate, tridecyl (meth)-acrylate, 5-methyltridecyl (meth)acrylate, tetradecyl (meth)acrylate, pentadecyl (meth)acrylate, hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate and/or eicosyltetratriacontyl (meth)acrylate.

These also include repeat units which are derived from dispersing oxygen- and nitrogen-functionalized monomers, as listed below by way of example:
These include repeat units which are derived from aminoalkyl (meth)acrylates, such as
N,N-dimethylaminoethyl (meth)acrylate,
N,N-dimethylaminopropyl (meth)acrylate,
N,N-diethylaminopentyl (meth)acrylate,
N,N-dibutylaminohexadecyl (meth)acrylate.

These include repeat units which are derived from aminoalkyl(meth)acrylamides, such as
N,N-dimethylaminopropyl(meth)acrylamide.

These include repeat units which are derived from hydroxyalkyl (meth)acrylates, such as
3-hydroxypropyl (meth)acrylate,
3,4-dihydroxybutyl (meth)acrylate,
2-hydroxyethyl (meth)acrylate,
2-hydroxypropyl (meth)acrylate,
2,5-dimethyl-1,6-hexanediol (meth)acrylate,
1,10-decanediol (meth)acrylate.

These include repeat units which are derived from heterocyclic (meth)acrylates, such as
2-(1-imidazolyl)ethyl (meth)acrylate,
2-(4-morpholinyl)ethyl (meth)acrylate,
1-(2-methacryloyloxyethyl)-2-pyrrolidone,
N-methacryloylmorpholine,
N-methacryloyl-2-pyrrolidinone,
N-(2-methacryloyloxyethyl)-2-pyrrolidinone,
N-(3-methacryloyloxypropyl)-2-pyrrolidinone.

These include repeat units which are derived from heterocyclic vinyl compounds, such as 2-vinylpyridine, 4-vinylpyridine, 2-methyl-5-vinylpyridine, 3-ethyl-4-vinylpyridine, 2,3-dimethyl-5-vinylpyridine, vinyl-pyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, N-vinylpyrrolidine, 3-vinylpyrrolidine, N-vinylcaprolactam, N-vinylbutyrolactam, vinyloxolane, vinylfuran, vinyloxazoles and hydrogenated vinyloxazoles.

The aforementioned ethylenically unsaturated monomers may be used individually or as mixtures. It is additionally possible to vary the monomer composition during the polymerization of the main chain in order to obtain defined structures, for example block copolymers.

According to the invention, the comb polymers have a molar degree of branching in the range of 0.1 to 10 mol %, preferably 0.3 to 6 mol %. Particular advantages are achieved by comb polymers whose degree of branching is in the range of 0.3% to 1.1 mol %, preferably of 0.4 to 1.0 mol % and more preferably of 0.4 to 0.6 mol %. The molar degree of branching of the comb polymers $f_{branch}$ is calculated by the formula $$f_{branch} = \frac{\sum_{a=1}^{A} n_a}{\sum_{a=1}^{A} n_a + \sum_{b=1}^{B} n_b}$$

where
A=number of types of repeat units which are derived from polyolefin-based macromonomers,
B=number of types of repeat units which are derived from low molecular weight monomers selected from the group consisting of styrene monomers having 8 to 17 carbon atoms, alkyl (meth)acrylates having 1 to 10 carbon atoms in the alcohol group, vinyl esters having 1 to 11 carbon atoms in the acyl group, vinyl ethers having 1 to 10 carbon atoms in the alcohol group, (di)alkyl fumarates having 1 to 10 carbon atoms in the alcohol group, (di)alkyl maleates having 1 to 10 carbon atoms in the alcohol group, and mixtures of these monomers,
$n_a$=number of repeat units which are derived from polyolefin-based macromonomers of the type a in the comb polymer molecule
$n_b$=number of repeat units which are derived from low molecular weight monomers selected from the group consisting of styrene monomers having 8 to 17 carbon atoms, alkyl (meth)acrylates having 1 to 10 carbon atoms in the alcohol group, vinyl esters having 1 to 11 carbon atoms in the acyl group, vinyl ethers having 1 to 10 carbon atoms in the alcohol group, (di)alkyl fumarates having 1 to 10 carbon atoms in the alcohol group, (di)alkyl maleates having 1 to 10 carbon atoms in the alcohol group, and mixtures of these monomers, of type b in the comb polymer molecule.

The molar degree of branching arises generally from the ratio of the monomers used if the comb polymer has been prepared by copolymerization of low molecular weight and macromolecular monomers. For the calculation, it is possible here to use the number-average molecular weight of the macromonomer.

In a particular aspect of the present invention, the comb polymer, especially the main chain of the comb polymer, may have a glass transition temperature in the range of −60 to 110° C., preferably in the range of −30 to 100° C., more preferably in the range of 0 to 90° C. and most preferably in the range of 20 to 80° C. The glass transition temperature is determined by DSC. The glass transition temperature can be estimated via the glass transition temperature of the corresponding homopolymers taking account of the proportions of the repeat units in the main chain.

If the comb polymer has been obtained by polymer-analogous reaction or by graft copolymerization, the molar degree of branching is found by known methods of determining the conversion.

The proportion of at least 80% by weight, preferably at least 90% by weight, of low molecular weight repeat units which are derived from monomers selected from the group consisting of styrene monomers having 8 to 17 carbon atoms, alkyl (meth)acrylates having 1 to 10 carbon atoms in the alcohol group, vinyl esters having 1 to 11 carbon atoms in the acyl group, vinyl ethers having 1 to 10 carbon atoms in the alcohol group, (di)alkyl fumarates having 1 to 10 carbon atoms in the alcohol group, (di)alkyl maleates having 1 to 10 carbon atoms in the alcohol group, and mixtures of these monomers, and of repeat units which are derived from polyolefin-based macromonomers, is based on the weight of the repeat units. In addition to the repeat units, polymers generally also comprise start groups and end groups which can form through initiation reactions and termination reactions. In a particular aspect of the present invention, the statement of at least 80% by weight, preferably at least 90% by weight, of low molecular weight repeat units which are derived from monomers selected from the group consisting of styrene monomers having 8 to 17 carbon atoms, alkyl (meth)-acrylates having 1 to 10 carbon atoms in the alcohol group, vinyl esters having 1 to 11 carbon atoms in the acyl group, vinyl ethers having 1 to 10 carbon atoms in the alcohol group, (di)alkyl fumarates having 1 to 10 carbon atoms in the alcohol group, (di)alkyl maleates having 1 to 10 carbon atoms in the alcohol group, and mixtures of these monomers, and of repeat units which are derived from polyolefin-based macromonomers, is based on the total weight of the comb polymers. The comb polymer has preferably 8 to 30% by weight, more preferably 10 to 26% by weight, of repeat units which are derived from polyolefin-based macromonomers, based on the total weight of the repeat units. The polydispersity of the comb polymers is obvious to the person skilled in the art. These data are therefore based on a mean value over all comb polymers.

Comb polymers of particular interest include those which preferably have a weight-average molecular weight $M_w$ in the of 500 000 to 1 000 000 g/mol, more preferably 100 000 to 500 000 g/mol and most preferably 150 000 to 450 000 g/mol.

The number-average molecular weight $M_n$ may preferably be in the range of 20 000 to 800 000 g/mol, more preferably 40 000 to 200 000 g/mol and most preferably 50 000 to 150 000 g/mol.

Comb polymers which are additionally appropriate to the purpose are those whose polydispersity index $M_w/M_n$ is in the range of 1 to 5, more preferably in the range of 2.5 to 4.5. The number-average and the weight-average molecular weight can be determined by known processes, for example gel permeation chromatography (GPC).

In a particular embodiment of the present invention, the comb polymers can be modified especially by grafting with dispersing monomers. Dispersing monomers are understood in particular to mean monomers with functional groups, through which the particles, especially soot particles, can be kept in solution. These include in particular the monomers detailed above which are derived from oxygen- and nitrogen-functionalized monomers, especially from heterocyclic vinyl compounds.

Through this embodiment, it is possible, inter alia, to achieve advantageous properties with regard to soot deposition, piston cleanliness and wear protection.

The inventive comb polymers can be prepared in various ways. A preferred process consists in the free-radical copolymerization, which is known per se, of low molecular weight monomers and macromolecular monomers.

For instance, these polymers can be effected especially by free-radical polymerization, and also related processes for controlled free-radical polymerization, for example ATRP (=Atom Transfer Radical Polymerization) or RAFT (=Reversible Addition Fragmentation Chain Transfer).

Customary free-radical polymerization is explained, inter alia, in Ullmanns's Encyclopedia of Industrial Chemistry, Sixth Edition. In general, a polymerization initiator and a chain transferrer are used for this purpose.

The usable initiators include the azo initiators well known in the technical field, such as AIBN and 1,1-azo-biscyclohexanecarbonitrile, and also peroxy compounds such as methyl ethyl ketone peroxide, acetylacetone peroxide, dilauryl peroxide, tert-butyl per-2-ethylhexanoate, ketone peroxide, tert-butyl peroctoate, methyl isobutyl ketone peroxide, cyclohexanone peroxide, dibenzoyl peroxide, tert-butyl peroxy-benzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, mixtures of two or more of the aforementioned compounds with one another, and also mixtures of the aforementioned compounds with compounds which have not been mentioned and can likewise form free radicals. Suitable chain transferers are especially oil-soluble mercaptans, for example n-dodecyl mercaptan or 2-mercaptoethanol, or else chain transferers from the class of the terpenes, for example terpinolene.

The ATRP process is known per se. It is assumed that this is a "living" free-radical polymerization, without any intention that this should restrict the description of the mechanism. In these processes, a transition metal compound is reacted with a compound which has a transferable atom group. This transfers the transferable atom group to the transition metal compound, which oxidizes the metal. This reaction forms a radical which adds onto ethylenic groups. However, the transfer of the atom group to the transition metal compound is reversible, so that the atom group is transferred back to the growing polymer chain, which forms a controlled polymerization system. The structure of the polymer, the molecular weight and the molecular weight distribution can be controlled correspondingly.

This reaction is described, for example, by J-S. Wang, et al., J. Am. Chem. Soc., vol. 117, p. 5614-5615 (1995), by Matyjaszewski, Macromolecules, vol. 28, p. 7901-7910 (1995). In addition, the patent applications WO 96/30421, WO 97/47661, WO 97/18247, WO 98/40415 and WO 99/10387, disclose variants of the ATRP explained above.

In addition, the inventive polymers may be obtained, for example, also via RAFT methods. This process is presented in detail, for example, in WO 98/01478 and WO 2004/083169, to which reference is made explicitly for the purposes of disclosure.

The polymerization may be carried out at standard pressure, reduced pressure or elevated pressure. The polymerization temperature too is uncritical. However, it is generally in the range of −20°-200° C., preferably 50°-150° C. and more preferably 80°-130° C.

The polymerization may be carried out with or without solvent. The term solvent is to be understood here in a broad sense. The solvent is selected according to the polarity of the monomers used, preference being given to using 100N oil, relatively light gas oil and/or aromatic hydrocarbons, for example toluene or xylene.

The low molecular weight monomers to be used to prepare the inventive comb polymers in a free-radical copolymerization are generally commercially available.

Macromonomers usable in accordance with the invention have exactly one double bond, which is preferably terminal.

The double bond may be present as a result of the preparation of the macromonomers. For example, a cationic polymerization of isobutylene forms a polyisobutylene (PIB) which has a terminal double bond.

In addition, functionalized polyolefinic groups may be converted to a macromonomer by suitable reactions.

For example, macroalcohols and/or macroamines based on polyolefins may be subjected to a transesterification or aminolysis with low molecular weight monomers which have at least one unsaturated ester group, for example methyl (meth)acrylate or ethyl (meth)acrylate.

This transesterification is widely known. For example, a heterogeneous catalyst system can be used for this purpose, such as lithium hydroxide/calcium oxide mixture (LiOH/CaO), pure lithium hydroxide (LiOH), lithium methoxide (LiOMe) or sodium methoxide (NaOMe) or a homogeneous catalyst system, such as isopropyl titanate (Ti(OiPr)$_4$) or dioctyltin oxide ($Sn(Oct)_2O$). The reaction is an equilibrium reaction. The low molecular weight alcohol released is therefore typically removed, for example, by distillation.

In addition, these macromonomers can be obtained by a direct esterification or direct amidation proceeding, for example, from methacrylic acid or methacrylic anhydride, preferably with acidic catalysis by p-toluenesulphonic acid or methanesulphonic acid or from free methacrylic acid by the DCC method (dicyclohexylcarbodiimide).

In addition, the present alcohol or the amide can be converted to a macromonomer by reaction with an acid chloride, such as (meth)acryloyl chloride.

In addition, it is also possible to prepare a macroalcohol via the reaction of the terminal PIB double bond, as forms in cationically polymerized PIB, with maleic anhydride (ene reaction) and subsequent reaction with an α,ω-amino alcohol.

Moreover, suitable macromonomers can be obtained by reacting a terminal PIB double bond with methacrylic acid or by a Friedel-Crafts alkylation of the PIB double bond onto styrene.

In the preparations of the macromonomers detailed above, preference is given to using polymerization inhibitors, for example 4-hydroxy-2,2,6,6-tetramethyl-piperidine oxyl radical or hydroquinone monomethyl ether.

The macroalcohols and/or macroamines which are based on polyolefins and are to be used for the reactions detailed above can be prepared in a known manner.

In addition, some of these macroalcohols and/or macroamines are commercially available.

The commercially available macroamines include, for example, Kerocom® PIBA 03. Kerocom® PIBA 03 is a polyisobutylene (PIB) of $M_n$=1000 g/mol which has been $NH_2$-functionalized to an extent of about 75% by weight and is supplied as a concentrate of about 65% by weight in aliphatic hydrocarbons by BASF AG (Ludwigshafen, Germany).

A further product is Kraton Liquid® L-1203, a hydrogenated polybutadiene which has been OH-functionalized to an extent of about 98% by weight (also known as olefin copolymer OCP) and has about 50% each of 1,2 repeat units and 1,4 repeat units of $M_n$=4200 g/mol, from Kraton Polymers GmbH (Eschborn, Germany).

Further suppliers of suitable macroalcohols based on hydrogenated polybutadiene are Cray Valley (Paris), a daughter company of Total (Paris), and the Sartomer Company (Exton/PA/USA).

The preparation of macroamines is described, for example, in EP 0 244 616 to BASF AG. The macroamines are prepared via hydroformylation and amination, preferably of polyisobutylene. Polyisobutylene offers the advantage of exhibiting no crystallization at low temperatures.

Advantageous macroalcohols may additionally be prepared according to the known patents to BASF AG, either via hydroboration (WO 2004/067583) of highly reactive polyisobutylene HR-PIB (EP 0 628 575), which contains an elevated proportion of terminal α-double bonds, or by hydroformylation followed by hydrogenation (EP 0 277 345). Compared to hydroformylation and hydrogenation, hydroboration affords higher alcohol functionalities.

Preferred macroalcohols based on hydrogenated polybutadienes can be obtained according to GB 2270317 to Shell International Research Maatschappij. A high proportion of 1,2 repeat units of about 60% and more can lead to significantly lower crystallization temperatures.

Some of the macromonomers detailed above are also commercially available, for example Kraton Liquid® L-1253, which is produced from Kraton Liquid® L-1203 and is a hydrogenated polybutadiene which has been methacrylate-functionalized to an extent of about 96% by weight and has about 50% each of 1,2 repeat units and 1,4 repeat units, from Kraton Polymers GmbH (Eschborn, Germany).

Kraton® L-1253 was synthesized according to GB 2270317 to Shell International Research Matschappij.

Macromonomers based on polyolefins and their preparation are also detailed in EP 0 621 293 and EP 0 699 694.

In addition to a free-radical copolymerization of macromonomers and low molecular weight monomers which has been detailed above, the inventive comb polymers may be obtained by polymer-analogous reactions.

In these reactions, a polymer is first prepared in a known manner from low molecular weight monomers and is then converted. In this case, the backbone of a comb polymer may be synthesized from a reactive monomer such as maleic anhydride, methacrylic acid or else glycidyl methacrylate and other unreactive short-chain backbone monomers. In this case, the initiator systems detailed above, such as t-butyl perbenzoate or t-butyl per-2-ethylhexanoate, and regulators such as n-dodecyl mercaptan may find use.

In a further step, for example in an alcoholysis or aminolysis, the side chains, which are also referred to as arms, may be generated. In this reaction, the macroalcohols and/or macroamines detailed above may be used.

The reaction of the initially formed backbone polymer with macroalcohols and/or macroamines corresponds essentially to the reactions detailed above of the macroalcohols and/or macroamines with low molecular weight compounds.

For example, the macroalcohols and/or macroamines may be converted to the inventive comb polymers in grafting reactions known per se, for example onto the present maleic anhydride or methacrylic acid functionalities in the backbone polymer with catalysis, for example, by p-toluenesulphonic acid or methanesulphonic acid to give esters, amides or imides. Addition of low molecular weight alcohols and/or amines, such as n-butanol or N-(3-aminopropyl)morpholine, allows this polymer-analogous reaction to be conducted to complete conversions, especially in the case of maleic anhydride backbones.

In the case of glycidyl functionalities in the backbone, an addition of the macroalcohol and/or of the macroamine can be performed so as to form comb polymers.

In addition, the macroalcohols and/or the macroamines can be converted by a polymer-analogous alcoholysis or aminolysis with a backbone which contains short-chain ester functionalities in order to generate comb polymers.

In addition to the reaction of the backbone polymer with macromolecular compounds, suitably functionalized polymers which have been obtained by reacting low molecular weight monomers with further low molecular weight monomers to form comb polymers can be reacted. In this case, the initially prepared backbone polymer has a plurality of functionalities which serve as initiators of multiple graft polymerizations.

For instance, a multiple cationic polymerization of i-butene can be initiated, which leads to comb polymers with polyolefin side arms. Suitable processes for such graft copolymerizations are also the ATRP and/or RAFT processes detailed above in order to obtain comb polymers with a defined architecture.

In a particular aspect of the present invention, the comb polymer of the present invention has a low proportion of olefinic double bonds. The iodine number is preferably less than or equal to 0.2 g per g of comb polymer, more preferably less than or equal to 0.1 g per g of comb polymer.

This proportion can be determined according to DIN 53241 after drawing off carrier oil and low molecular weight residual monomers at 180° C. under reduced pressure for 24 hours.

Appropriately, the comb polymer may have repeat units which are derived from n-butyl methacrylate and/or from n-butyl acrylate. Particularly advantageously, the proportion of repeat units which are derived from n-butyl methacrylate and/or from n-butyl acrylate may preferably be at least 50% by weight, more preferably at least 60% by weight, based on the total weight of repeat units.

In a preferred modification of the present invention, the comb polymer may have repeat units which are derived from styrene. The proportion of repeat units which are derived from styrene may preferably be in the range of 0.1 to 30% by weight, more preferably 5 to 25% by weight.

Surprising advantages may be exhibited especially by comb polymers which have repeat units which are derived from alkyl (meth)acrylates having 11-30 carbon atoms in the alkyl radical. Appropriately, the proportion of repeat units which are derived from alkyl (meth)-acrylates having 11 to 30 carbon atoms in the alkyl radical may be in the range of 0.1 to 15% by weight, more preferably 1 to 10% by weight.

In a particular aspect of the present invention, the comb polymer preferably has repeat units which are derived from styrene, and repeat units which are derived from n-butyl methacrylate. The weight ratio of styrene repeat units and n-butyl methacrylate repeat units is preferably in the range of 1:1 to 1:9, more preferably 1:2 to 1:8.

In a further preferred embodiment of the present invention, the comb polymer preferably has repeat units which are derived from styrene, and repeat units which are derived from n-butyl acrylate. The weight ratio of styrene repeat units and n-butyl acrylate repeat units is preferably in the range of 1:1 to 1:9, more preferably 1:2 to 1:8.

In a further preferred feature of the present invention, the comb polymer preferably has repeat units which are derived from methyl methacrylate and repeat units which are derived from n-butyl methacrylate. The weight ratio of methyl methacrylate repeat units and n-butyl methacrylate repeat units is preferably in the range of 1:1 to 0:100, more preferably 3:7 to 0:100.

The inventive comb polymer can preferably be used in a lubricant oil composition. A lubricant oil composition comprises at least one lubricant oil.

The lubricant oils include especially mineral oils, synthetic oils and natural oils.

Mineral oils are known per se and commercially available. They are generally obtained from mineral oil or crude oil by distillation and/or refining and optionally further purification and finishing processes, the term mineral oil including in particular the higher-boiling fractions of crude or mineral oil. In general, the boiling point of mineral oil is higher than 200° C., preferably higher than 300° C., at 5000 Pa. The production by low-temperature carbonization of shale oil, coking of bituminous coal, distillation of brown coal with exclusion of air, and also hydrogenation of bituminous or brown coal is likewise possible. Accordingly, mineral oils have, depending on their origin, different proportions of aromatic, cyclic, branched and linear hydrocarbons.

In general, a distinction is drawn between paraffin-base, naphthenic and aromatic fractions in crude oils or mineral oils, in which the term paraffin-base fraction represents longer-chain or highly branched isoalkanes, and naphthenic fraction represents cycloalkanes. In addition, mineral oils, depending on their origin and finishing, have different fractions of n-alkanes, isoalkanes having a low degree of branching, known as mono-methyl-branched paraffins, and compounds having heteroatoms, in particular O, N and/or S, to which a degree of polar properties are attributed. However, the assignment is difficult, since individual alkane molecules may have both long-chain branched groups and cycloalkane radicals, and aromatic parts. For the purposes of the present invention, the assignment can be effected to DIN 51 378, for example. Polar fractions can also be determined to ASTM D 2007.

The proportion of n-alkanes in preferred mineral oils is less than 3% by weight, the fraction of O-, N- and/or S-containing compounds less than 6% by weight. The fraction of the aromatics and of the mono-methyl-branched paraffins is generally in each case in the range of 0 to 40% by weight. In one interesting aspect, mineral oil comprises mainly naphthenic and paraffin-base alkanes which have generally more than 13, preferably more than 18 and most preferably more than carbon atoms. The fraction of these compounds is generally ≥60% by weight, preferably ≥80% by weight, without any intention that this should impose a restriction. A preferred mineral oil contains 0.5 to 30% by weight of aromatic fractions, 15 to 40% by weight of naphthenic fractions, 35 to 80% by weight of paraffin-base fractions, up to 3% by weight of n-alkanes and 0.05 to 5% by weight of polar compounds, based in each case on the total weight of the mineral oil.

An analysis of particularly preferred mineral oils, which was effected by means of conventional processes such as urea separation and liquid chromatography on silica gel, shows, for example, the following constituents, the percentages relating to the total weight of the particular mineral oil used:

n-alkanes having approx. 18 to 31 carbon atoms:
0.7-1.0%,
slightly branched alkanes having 18 to 31 carbon atoms:
1.0-8.0%,
aromatics having 14 to 32 carbon atoms:
0.4-10.7%,
iso- and cycloalkanes having 20 to 32 carbon atoms:
60.7-82.4%,
polar compounds:
0.1-0.8%,
loss:
6.9-19.4%.

An improved class of mineral oils (reduced sulphur content, reduced nitrogen content, higher viscosity index, lower pour point) results from hydrogen treatment of the mineral oils (hydroisomerization, hydrocracking, hydrotreatment, hydrofinishing). In the presence of hydrogen, this essentially reduces aromatic components and builds up naphthenic components.

Valuable information with regard to the analysis of mineral oils and a list of mineral oils which have a different composition can be found, for example, in Ullmann's Encyclopedia of Industrial Chemistry, 5th Edition on CD-ROM, 1997, under "lubricants and related products".

Synthetic oils include organic esters, for example diesters and polyesters, polyalkylene glycols, polyethers, synthetic hydrocarbons, especially polyolefins, among which preference is given to polyalphaolefins (PAOs), silicone oils and perfluoroalkyl ethers. In addition, it is possible to use synthetic base oils originating from gas to liquid (GTL), coal to liquid (CTL) or biomass to liquid (BTL) processes. They are usually somewhat more expensive than the mineral oils, but have advantages with regard to their performance.

Natural oils are animal or vegetable oils, for example neatsfoot oils or jojoba oils.

The base oils for lubricant oil formulations are divided into groups according to API (American Petroleum Institute). Mineral oils are divided into group I (non-hydrogen-treated) and, depending on the degree of saturation, sulphur content and viscosity index, into groups II and III (both hydrogen-treated). PAOs correspond to groups IV. All other base oils are encompassed in group V.

These lubricant oils may also be used as mixtures and are in many cases commercially available.

The concentration of the comb polymer in the lubricant oil composition is preferably in the range of 0.1 to 40% by weight, more preferably in the range of 0.2-20% by weight and most preferably in the range of 0.5-10% by weight, based on the total weight of the composition.

In addition to the aforementioned components, a lubricant oil composition may comprise further additives. Preferred additives may be based especially on a linear polyalkyl (meth)acrylate having 1 to 30 carbon atoms in the alcohol group (PAMA). These additives include DI additives (dispersants, detergents, defoamers, corrosion inhibitors, antioxidants, wear protection and extreme pressure additives, friction modifiers), pour point improvers (more preferably based on polyalkyl (meth)acrylate having 1 to 30 carbon atoms in the alcohol group) and/or dyes.

In addition, the lubricant oil compositions detailed here, as well as the inventive comb polymers, may also be present in mixtures with conventional VI improvers. These include especially hydrogenated styrene-diene copolymers (HSDs, U.S. Pat. No. 4,116,917, U.S. Pat. No. 3,772,196 and U.S. Pat. No. 4,788,316 to Shell Oil Company), especially based on butadiene and isoprene, and also olefin copolymers (OCPs, K. Marsden: "Literature Review of OCP Viscosity Modifiers", Lubrication Science 1 (1988), 265), especially of the poly(ethylene-co-propylene) type, which may often also be present in N/O-functional form with dispersing action, or PAMAs, which are usually present in N-functional form with advantageous additive properties (boosters) as dispersants, wear protection additives and/or friction modifiers (DE 1 520 696 to Röhm and Haas, WO 2006/007934 to RohMax Additives).

Compilations of VI improvers and pour point improvers for lubricant oils, especially motor oils, are detailed, for example, in T. Mang, W. Dresel (eds.): "Lubricants and Lubrication", Wiley-VCH, Weinheim 2001: R. M. Mortier, S. T. Orszulik (eds.): "Chemistry and Technology of Lubricants", Blackie Academic & Professional, London 1992; or J. Bartz: "Additive für Schmierstoffe", Expert-Verlag, Renningen-Malmsheim 1994.

Appropriate dispersants include poly(isobutylene) derivatives, e.g. poly(isobutylene)succinimides (PIBSIs); ethylene-propylene oligomers with N/O functionalities.

The preferred detergents include metal-containing compounds, for example phenoxides; salicylates; thiophosphonates, especially thiopyrophosphonates, thiophosphonates and phosphonates; sulphonates and carbonates. As metals, these compounds comprise especially calcium, magnesium and barium. These compounds may be used preferably in neutral or overbased form.

Of particular interest are additionally defoamers, which are in many cases divided into silicone-containing and silicone-free defoamers. The silicone-containing defoamers include linear poly(dimethylsiloxane) and cyclic poly(dimethylsiloxane). The silicone-free defoamers which may be used are in many cases polyethers, for example poly(ethylene glycol) or tributyl phosphate.

In a particular embodiment, the inventive lubricant oil compositions may comprise corrosion inhibitors. These are in many cases divided into antirust additives and metal passivators/deactivators. The antirust additives used may, inter alia, be sulphonates, for example petroleumsulphonates or (in many case overbased) synthetic alkylbenzenesulphonates, e.g. dinonylnaphthenesulphonates; carboxylic acid derivatives, for example lanolin (wool fat), oxidized paraffins, zinc naphthenates, alkylated succinic acids, 4-nonylphenoxy-acetic acid, amides and imides (N-acylsarcosine, imidazoline derivatives); amine-neutralized mono- and dialkyl phosphates; morpholine, dicyclohexylamine or diethanolamine. The metal passivators/deactivators include benzotriazole, tolyltriazole, 2-mercaptobenzothiazole, dialkyl-2,5-dimercapto-1,3,4-thiadiazole; N,N'-disalicylideneethylenediamine, N,N'-disalicylidenepropylenediamine; zinc dialkyldithiophosphates and dialkyl dithiocarbamates.

A further preferred group of additives is that of antioxidants. The antioxidants include, for example, phenols, for example 2,6-di-tert-butylphenol (2,6-DTB), butylated hydroxytoluene (BHT), 2,6-di-tert-butyl-4-methylphenol, 4,4'-methylenebis(2,6-di-tert-butylphenol); aromatic amines, especially alkylated diphenylamines, N-phenyl-1-naphthylamine (PNA), polymeric 2,2,4-trimethyldihydroquinone (TMQ); compounds containing sulphur and phosphorus, for example metal dithiophosphates, e.g. zinc dithiophosphates (ZnDTP), "OOS triesters"=reaction products of dithiophosphoric acid with activated double bonds from olefins, cyclopentadiene, norbornadiene, α-pinene, polybutene, acrylic esters, maleic esters (ashless on combustion); organosulphur compounds, for example dialkyl sulphides, diaryl sulphides, polysulphides, modified thiols, thiophene derivatives, xanthates, thioglycols, thioaldehydes, sulphur-containing carboxylic acids; heterocyclic sulphur/nitrogen compounds, especially dialkyldimercaptothiadiazoles, 2-mercaptobenzimidazoles; zinc and methylene bis (dialkyldithiocarbamate); organophosphorus compounds, for example triaryl and trialkyl phosphites; organocopper compounds and overbased calcium- and magnesium-based phenolates and salicylates.

The preferred antiwear (AW) and extreme pressure (EP) additives include phosphorus compounds, for example trialkyl phosphates, triaryl phosphates, e.g. tricresyl phosphate, amine-neutralized mono- and dialkyl phosphates, ethoxylated mono- and dialkyl phosphates, phosphites, phosphonates, phosphines; compounds containing sulphur and phosphorus, for example metal dithiophosphates, e.g. zinc $C_{3-12}$dialkyldithiophosphates (ZnDTPs), ammonium dialkyldithiophosphates, antimony dialkyldithiophosphates, molybdenum dialkyldithiophosphates, lead dialkyldithiophosphates, "OOS triesters"=reaction products of dithiophosphoric acid with activated double bonds from olefins, cyclopentadiene, norbornadiene, α-pinene, polybutene, acrylic esters, maleic esters, triphenylphosphorothionate (TPPT); compounds containing sulphur and nitrogen, for example zinc bis(amyl dithiocarbamate) or methylenebis(di-n-butyl dithiocarbamate); sulphur compounds containing elemental sulphur and $H_2S$-sulphurized hydrocarbons (diisobutylene, terpene); sulphurized glycerides and fatty acid esters; overbased sulphonates; chlorine compounds or solids such as graphite or molybdenum disulphide.

A further preferred group of additives is that of friction modifiers. The friction modifiers used may include mechanically active compounds, for example molybdenum disulphide, graphite (including fluorinated graphite), poly(trifluoroethylene), polyamide, polyimide; compounds which form adsorption layers, for example long-chain carboxylic acids, fatty acid esters, ethers, alcohols, amines, amides, imides; compounds which form layers through tribochemical reactions, for example saturated fatty acids, phosphoric acid and thiophosphoric esters, xanthogenates, sulphurized fatty acids; compounds which form polymer-like layers, for example ethoxylated dicarboxylic acid partial esters, dialkyl phthalates, methacrylates, unsaturated fatty acids, sulphurized olefins or organometallic compounds, for example molybdenum compounds (molybdenum dithiophosphates and molybdenum dithiocarbamates MoDTC) and their combinations with ZnDTPs, copper-containing organic compounds.

Some of the compounds detailed above may fulfil multiple functions. ZnDTP, for example, is primarily an antiwear additive and extreme pressure additive, but also has the character of an antioxidant and corrosion inhibitor (here: metal passivator/deactivator).

The additives detailed above are described in more detail, inter alia, in T. Mang, W. Dresel (eds.): "Lubricants and Lubrication", Wiley-VCH, Weinheim 2001; R. M. Mortier, S. T. Orszulik (eds.): "Chemistry and Technology of Lubricants".

Preferred lubricant oil compositions have a viscosity, measured at 40° C. to ASTM D 445, in the range of 10 to 120 mm$^2$/s, more preferably in the range of 22 to 100 mm$^2$/s. The kinematic viscosity $KV_{100}$ measured at 100° C. is preferably at least 5.5 mm$^2$/s, more preferably at least 5.6 mm$^2$/s and most preferably at least 5.8 mm$^2$/s.

In a particular aspect of the present invention, preferred lubricant oil compositions have a viscosity index determined to ASTM D 2270 in the range of 100 to 400, more preferably in the range of 150 to 350 and most preferably in the range of 175 to 275.

Lubricant oil compositions which are additionally of particular interest are those which have a high-temperature high-shear viscosity HTHS measured at 150° C. of at least 2.4 mPas, more preferably at least 2.6 mPas. The high-temperature high-shear viscosity HTHS measured at 100° C. is preferably at most 10 mPas, more preferably at most 7 mPas and most preferably at most 5 mPas. The difference between the high-temperature high-shear viscosities HTHS measured at 100° C. and 150° C., $HTHS_{100}$-$HTHS_{150}$, is preferably at most 4 mPas, more preferably at most 3.3 mPas and most preferably at most 2.5 mPas. The ratio of high-temperature high-shear viscosity at 100° C. $HTHS_{100}$ to high-temperature high-shear viscosity at 150° C. $HTHS_{150}$, $HTHS_{100}$/$HTHS_{150}$, is preferably at most 2.0, more preferably at most 1.9. The high-temperature high-shear viscosity HTHS can be measured at the particular temperature to ASTM D4683.

In an appropriate modification, the permanent shear stability index (PSSI) to ASTM D2603 Ref. B (ultrasound treatment for 12.5 minutes) may be less than or equal to 35, more preferably less than or equal to 20. Advantageously, it is also possible to obtain lubricant oil compositions which have a permanent shear stability index (PSSI) to DIN 51381 (30 cycles of a Bosch pump) of at most 5, preferably at most 2 and most preferably at most 1.

The fuel saving (compared to 15W-40 reference motor oil RL 191) for use in passenger motor vehicles is determined in Europe generally according to test method CEC L-54-T-96 ("Mercedes-Benz M111 Fuel Economy Test"; CEC=Coordinating European Council for Development of Performance Tests for Transportation Fuels, Lubricants and Other Fluids). More recent results (K. Hedrich, M. A. Mueller, M. Fischer: "Evaluation of Ashless, Phosphorus Free and Low Sulfur Polymeric Additives that Improve the Performance of Fuel Efficient Engine Oils" in Conference Proceedings of the International Tribology Conference (ITC 2005) at Kobe/Japan; K. Hedrich, G. Renner: "New Challenge of VI Improver for Next Generation Engine Oils" in Conference Proceedings of the International Tribology Conference (ITC 2000) at Nagasaki/Japan) show that another test method ("RohMax test") can also afford comparable results. Here, not a 2.0 L gasoline engine but rather a 1.9 L diesel engine (81 kW at 4150 rpm) is used. The setup of this engine corresponds essentially to the setup described in the test method CEC L-78-T-99 ("Volkswagen Turbocharged DI Diesel Piston Cleanliness and Ring Sticking Evaluation"). Exact maintenance of the oil temperature according to CEC L-54-T-96 necessitates additional cooling in the setup. Common features and differences of CEC L-54-T-96 and of the "RohMax test" are as follows:

|  | CEC L-54-T-96 ("Mercedes-Benz M111 Fuel Economy Test") | "RohMax test" using a setup according to CEC L-78-T-99 |
|---|---|---|
| Engine | Mercedes-Benz 2.0 L 4 cylinders; gasoline | Volkswagen 1.9 L TDI 4 cylinders; diesel |
| Program | 3 town cycles of 195 seconds + out-of-town driving cycle of 400 seconds (based on the standardized European MVEG cycles; MVEG = Motor Vehicle Emissions Group) | |
| Oil temperature | 1st town cycle at 20° C. 2nd town cycle at 33° C. 3rd town cycle at 75° C. out-of-town cycle at 88° C. | |
| Determination of the fuel consumption | Overall cycle measured [grams] | Rising sequence of point measurements in grams/kWh (average over several measurements); both in the town cycles and in the out-of-town cycle; overall cycle calculated [grams] |
| Oil change | with engine running (amount of oil required 80 L) | with engine stationary, flushing twice (amount of oil required 15 L) |

After the tests on test benches as described above, the real fuel consumption in the vehicle is determined typically in the form of field tests, for example using a taxi fleet of 10 vehicles which travel at a defined number of km (e.g. 10 000 km) over a defined period (e.g. 6 months).

The present invention will be illustrated in detail hereinafter with reference to examples and comparative examples, without any intention that this should impose a restriction.

SYNTHESES OF THE COMB POLYMERS

Examples 1 to 5 and Comparative Examples 1 to 3

An apparatus comprising a 4-neck flask and precision glass sabre stirrer is initially charged with a 600 g mixture of a mixture of low molecular weight monomers and macromonomer whose composition is stated in Table 1, and a 400 g mixture of Shell Risella 907 gas oil and 35 g of 100N oil (65%/35%). After heating to 115° C. under nitrogen, 1.2 g of 2,2-bis-tert-butylperoxybutane are added and the temperature is maintained. 3 h and 6 h after the first addition of initiator, another 1.2 g of 2,2-bis-tert-butylperoxybutane is supplied in each case and the mixture is stirred at 115° C. overnight. The next day, the mixture is diluted from 60% to 40% solids with 500 g of 150N oil. 1500 g of a 40% solution of comb polymer in mineral oil are obtained.

TABLE 1

| | | Monomer mixture Gross composition [wt %] | | | | Net polymer composition [wt %] | | |
|---|---|---|---|---|---|---|---|---|
| Example 1 | hPBD$_{MM4800}$ 28.0 | nBMA 58.0 | Sty 14.0 | LMA 0 | 26 | 59 | 15 | 0 |
| Example 2 | hPBD$_{MM4800}$ 25.0 | nBMA 64.0 | Sty 11.0 | LMA 0 | 23 | 65 | 12 | 0 |
| Example 3 | hPBD$_{MM4800}$ 16.0 | nBMA 67.0 | Sty 12 | LMA 5 | 15 | 68 | 12 | 5 |
| Example 4 | hPBD$_{MM4800}$ 12.0 | nBMA 71.0 | Sty 12 | LMA 5 | 11 | 71 | 13 | 5 |
| Example 5 | hPBD$_{MM4800}$ 12.0 | nBMA 83.0 | Sty 0 | LMA 5 | 11 | 84 | 0 | 5 |
| Example 6 | hPBD$_{MM4800}$ 42 | nBMA 18 | Sty 40 | MMA 0 | 40.8 | 18.4 | 40.9 | 0 |
| Comparative Example 1 | hPBD$_{MM4800}$ 42.0 | nBMA 12.0 | Sty 3 | LMA 43 | 41 | 12 | 3 | 44 |
| Comparative Example 2 | hPBD$_{MM4800}$ 20.0 | nBMA 20.0 | MMA 15 | LMA 45 | 18.4 | 20.4 | 15.3 | 45.9 |
| Comparative Example 3 | hPBD$_{MM4800}$ 20.0 | nBMA 20.0 | MMA 8 | LMA 52 | 18.4 | 20.4 | 8.2 | 53 |

In Table 1:
hPBD$_{MM4800}$: hydrogenated polybutadiene from CrayValley (Paris) with M$_n$ = 4800 g/mol, T$_M$ = −25° C. and f$_{MM}$ in the range of 90-95% (macromonomer)
nBMA: n-butyl methacrylate
Sty: styrene
LMA: alkyl methacrylate mixture having 12 to 14 carbon atoms in the alcohol radicals
MMA: methyl methacrylate The macromonomer functionality f$_{MM}$ of the macromonomer was derived from the GPC curves of the comb polymers themselves, as detailed in WO 2007/025837.

The molecular weights and the polydispersity index PDI were determined by means of GPC, as detailed in WO 2007/025837.

TABLE 1

| | M$_w$ [g/mol] | PDI | f$_{branch}$ |
|---|---|---|---|
| Example 1 | 191 000 | 3.5 | 1.0% |
| Example 2 | 325 000 | 4.2 | 0.8% |
| Example 3 | 352 000 | 3.7 | 0.5% |
| Example 4 | 312 000 | 3.5 | 0.4% |
| Example 5 | 374 000 | 4.5 | 0.4% |
| Example 6 | 193 000 | 4.0 | 1.6% |
| Comparative Example 1 | | | 2.9% |
| Comparative Example 2 | 662 000 | 6.7 | 0.8% |
| Comparative Example 3 | 599 000 | 5.1 | 0.9% |

Evaluation of the Comb Polymers
A) In 0W-20 Base Oil with DI Package Based on API Group I/III Oil:

The resulting comb polymer additives were characterized by means of measurements of the kinematic viscosities at 40° C. and 100° C. (KV$_{40}$ and KV$_{100}$) to ASTM D445, by means of the CCS viscosity determined to ASTM D5292 and by means of the high-temperature high-shear viscosity HTHS$_{100}$ measured at 100° C. to ASTM D4683, of a solution of high-temperature high-shear viscosity HTHS$_{150}$=2.6 mPas set at 150° C. (ASTM D 4683) in a DI package-containing 0W-20 base oil (KV40=23.45 mm$^2$/s, KV100 4.92 mm$^2$/s, VI=138).

It is shown clearly that the inventive comb polymers have a significantly lower KV$_{40}$ (and likewise lower KV$_{100}$) and a lower high-temperature high-shear viscosity HTHS$_{100}$ at 100° C. and the polymers detailed in the publication EP 0699694. Similar results are also obtained in relation to the CCS viscosity at −35° C. The results of the evaluation detailed are shown in Table 2.

For comparison, commercially available VI improvers were additionally examined. For this purpose, motor oil formulations were produced with commercially available Infineum SV200 (an HSD star polymer) and Viscoplex® 6-950 (linear PAMA from RohMax Additives GmbH). These results are likewise shown in Table 2.

TABLE 2

| Polymer according to | KV$_{40}$ [mm$^2$/s] | KV$_{100}$ [mm$^2$/s] | HTHS$_{100}$ [mPas] | CCS-35 [mPas] |
|---|---|---|---|---|
| Example 1 | 27.9 | 6.52 | 4.96 | 4832 |
| Example 2 | 27.5 | 6.51 | 4.83 | 4807 |
| Example 3 | 27.3 | 6.56 | 4.82 | 5028 |
| Example 4 | 26.4 | 6.30 | 4.63 | 4387 |
| Example 5 | 26.2 | 6.34 | 4.68 | 4741 |
| Comparative Example 1 | 39.0 | 8.14 | 5.40 | 5989 |
| Comparative Example 2 | 35.3 | 8.73 | 5.20 | 5678 |
| Comparative Example 3 | 39.7 | 9.19 | 5.37 | 5854 |
| Infineum SV200 | 36.8 | 7.70 | 4.95 | 5350 |
| Viscoplex ® 6-950 | 37.0 | 8.64 | 5.01 | 5590 |

In addition, the shear stabilities of the lubricant oil compositions which comprised the comb polymers of Examples 1 to 5 were examined. For this purpose, PSSI measurements were performed to DIN 51382 (30 cycles of a Bosch pump), and all lubricant oils achieved an excellent PSSI value of 0, i.e. the products exhibited no decline in KV$_{100}$ whatsoever. As a result of this, it is surprisingly possible to provide a lubricant oil composition which to remain relatively close to the in the specifications detailed above for the viscosity values at high temperature, for example 100° C., without the values in use being lower than these values.

To examine the compatibility of the comb polymers with pour point improvers, further tests were performed. To this end, lubricant oil compositions which comprised a commercially available pour point improver (Viscoplex® 1-247) in a concentration of 0.37% by weight were prepared. In this case, the pour point (PP) was measured to ASTM D97, as were dynamic viscosity DV and yield stress YS to MRV-TP1 (ASTM D4684). The results are detailed in Table 3.

TABLE 3

| Polymer according to | PP [° C.] | MRV-TP1 YS-40 [Pa] | MRV-TP1 DV-40 [mPa] |
|---|---|---|---|
| Example 3 | −48 | <35 | 20 900 |
| Example 4 | −42 | <35 | 16 030 |
| Example 5 | −42 | <35 | 18 140 |

The results show that lubricant oil compositions which the present comb polymers in combination with pour points depressants, especially based on PAMA, have outstanding low-temperature properties (target: <−40° C./<35 Pa/<=60 000 mPas).

B) In 0W-20 Base Oil Based on API Group III Oil:

A 0W-20 base oil of KV40=27.24 mm$^2$/s, KV100=5.390 mm$^2$/s and VI=136 was prepared from 11.2% HiTEC® 1192 (Afton Chemical), 8.8% Nexbase® 3030, 80% Nexbase® 3043 (Neste Oil). Thereafter, as in A), the viscometry of examples and comparative examples in formulations of HTHS$_{150}$=2.6 mPas was analysed.

In this 0W-20 too, it was found that the inventive comb polymers have a significantly lower KV$_{40}$ (and likewise lower KV$_{100}$) and a lower high-temperature high-shear viscosity HTHS$_{100}$ than Viscoplex® 6-950. Similarly results are also obtained with regard to the CCS viscosity at −35° C. The results of the evaluation detailed are shown in Table 4.

TABLE 4

| Polymer according to | KV$_{40}$ [mm$^2$/s] | KV$_{100}$ [mm$^2$/s] | HTHS$_{100}$ [mPas] | CCS-35 [mPas] |
|---|---|---|---|---|
| Example 3 | 30.82 | 6.623 | 4.98 | 5784 |
| Example 5 | 30.49 | 6.595 | 4.85 | 5648 |
| Viscoplex ® 6-950 | 41.54 | 10.06 | 5.52 | 6336 |

The 0W-20 formulations too, in the presence of a commercially available pour point improver based on PAMA (Viscoplex® 1-247 in a concentration of approx. 0.37% by weight) give excellent MRV-TP1 low-temperature properties. The results are shown in Table 5 (target: <35 Pa or <=60 000 mPas).

TABLE 5

| Polymer according to | MRV-TP1 YS-40 [Pa] | MRV-TP1 DV-40 [mPa] |
|---|---|---|
| Example 3 | <35 | 14 350 |
| Example 5 | <35 | 14 710 |

C) In 5W-30 Base Oil with DI Package Based on API Group III Oil:

Finally, a third series of measurements was performed in a DI package-containing 5W-30 base oil (KV40=38.76 mm$^2$/s, KV100=6.938 mm$^2$/s and VI=140). Deviating from SAE J300, which required "only" HTHS$_{150}$=2.9 mPas for a 5W-30 formulation, the 5W-30 formulations were adjusted to HTHS$_{150}$=3.5 mPas in a manner customary for European engine manufacturers (for example Mercedes-Benz operating fluid specifications MB229.1 and MB228.3 for factory fillings).

In the 5W-30 formulations too, it was found that the inventive comb polymers have a significantly lower KV$_{40}$ (and likewise lower KV$_{100}$) and a lower high-temperature high-shear viscosity HTHS$_{100}$ than Viscoplex® 6-950. The results of the evaluation detailed are compiled in Table 6.

TABLE 6

| Polymer according to | KV$_{40}$ [mm$^2$/s] | KV$_{100}$ [mm$^2$/s] | HTHS$_{100}$ [mPas] | CCS-30 [mPas] |
|---|---|---|---|---|
| Example 3 | 46.19 | 9.502 | 6.76 | 6032 |
| Example 5 | 46.04 | 10.200 | 6.49 | 5929 |
| Viscoplex ® 6-950 | 71.69 | 15.29 | 7.63 | 6830 |

The 5W-30 formulations too, in the presence of a commercially available pour point improver based on PAMA (Viscoplex® 1-247 in a concentration of approx. 0.37% by weight) give excellent MRV-TP1 low-temperature properties. The results are shown in Table 7 (target: <35 Pa or <=60 000 mPas).

TABLE 7

| Polymer according to | MRV-TP1 YS-35 [Pa] | MRV-TP1 DV-35 [mPa] |
|---|---|---|
| Example 3 | <35 | 18 010 |
| Example 5 | <35 | 17 350 |

D) Examination of Fuel Saving with the "RohMax Test"

Using the RohMax test detailed above, the fuel saving with various polymers was examined. To determine the measurement accuracy of the examination, a run with a 15W-40 oil (CEC reference motor oil RL 191) was carried out at the start and at the end of the test series. The determination of the fuel saving was carried out with the polymers detailed in Table 8, for which 5W-30 formulations were produced according to the examples adduced under point C). The results achieved are likewise stated in Table 8.

TABLE 8

| Polymer according to | Formulation | Consumption [g] |
|---|---|---|
| Example 5 | 5W-30 | 658.77 |
| Example 6 | 5W-30 | 659.09 |
| VISCOPLEX ® 6-950 | 5W-30 | 664.21 |
| — | 15W-40 (before the test runs) | 675.03 |
| — | 15W-40 (after the test runs) | 675.09 |

The tests show excellent repeatability, as is evident from the comparative runs with the 15W-40 reference oil. This repeatability, which is well below 0.1 g, was achieved especially through careful control of the temperature conditions.

In addition, it was found that, in the case of use of inventive comb polymers, a surprisingly high fuel saving compared to VISCOPLEX® 6-950 can be achieved. Moreover, a comparison of Example 5 with Example 6 shows that, using the comb polymers detailed in claim 3, a further, significant reduction in fuel consumption occurs.

The invention claimed is:

1. An additive for reducing fuel consumption of a vehicle, comprising a comb polymer of repeat units comprising:
   11-23 wt % of a hydrogenated polybutadiene macromonomer,
   65-84 wt % of n-butyl methacrylate, and up to 13 wt % of styrene,
wherein
the hydrogenated polybutadiene macromonomer is copolymerizable with the n-butyl methacrylate and styrene,
wt % is based on the total weight of the comb polymer, and
wherein
the comb polymer comprises a main chain and a side chain,
the main chain comprises copolymerized units of methacrylates and styrene,
a molar degree of branching of the comb polymer is 0.3-0.5 mol %,
a weight average molecular weight of the comb polymer is from 312,000 to 374,000 g/mol, and
a glass transition temperature of the main chain of the comb polymer is in the range of 0 to 90° C.

2. The additive according to claim 1, wherein the comb polymer comprises:
8-15 wt % of the hydrogenated polybutadiene macromonomer,
68-84 wt % of n-butyl methacrylate,
styrene up to 13 wt %, and
further comprises up to 5 wt % of an alkyl methacrylate mixture having 12 to 14 carbon atoms in the alkyl groups.

3. The additive according to claim 1, wherein the content of styrene is from 5 to 13% by weight.

4. A lubricant oil formulation comprising the additive according to claim 1.

5. The lubricant oil formulation according to claim 4, further comprising at least one base oil selected from the group consisting of API group I, II, III, IV and group V.

6. The lubricant oil formulation according to claim 4, further comprising at least one additional additive.

7. The lubricant oil formulation according to claim 6, wherein the additive is at least one selected from the group consisting of a viscosity index improver, a pour point improver, a dispersant, a detergent, a defoamer, a corrosion inhibitor, an antioxidant, an antiwear additive, an extreme pressure additive and a friction modifier.

8. The lubricant oil formulation according to claim 4, wherein a difference between a high-temperature high-shear viscosity at 100° C. and 150° C. of the lubricant is from 2.5 to 4 mPA·s according to ASTM D 4683.

9. The additive of claim 2, wherein the comb polymer consists of:
8-15 wt % of the hydrogenated polybutadiene macromonomer,
68-84 wt % of n-butyl methacrylate,
up to 13 wt % of styrene, and
up to 5 wt % of the alkyl methacrylate mixture having 12 to 14 carbon atoms in the alkyl groups.

10. The additive of claim 9, wherein the comb polymer consists of:
11 wt % of a hydrogenated polybutadiene macromonomer having a Mn of 4,800 g/mol,
84 wt % of n-butyl methacrylate, and
5 wt % of an alkyl methacrylate mixture having 12 to 14 carbon atoms in the alkyl groups.

11. A lubricant oil formulation comprising:
the additive according to claim 2; and
at least one base oil selected from the group consisting of API group I, II, III, IV and group V;
wherein a difference between a high-temperature high-shear viscosity at 100° C. and 150° C. of the lubricant is from 2.5 to 4 mPA·s according to ASTM D 4683.

12. A lubricant oil formulation comprising:
the additive according to claim 9; and
at least one base oil selected from the group consisting of API group I, II, III, IV and group V;
wherein a difference between a high-temperature high-shear viscosity at 100° C. and 150° C. of the lubricant is from 2.5 to 4 mPA·s according to ASTM D 4683.

13. A lubricant oil formulation comprising:
the additive according to claim 10; and
at least one base oil selected from the group consisting of API group I, II, III, IV and group V;
wherein a difference between a high-temperature high-shear viscosity at 100° C. and 150° C. of the lubricant is from 2.5 to 4 mPA·s according to ASTM D 4683.

* * * * *